(No Model.)
P. GANZHORN.
COMPOUND MEAT TOOL.
No. 583,682. Patented June 1, 1897.
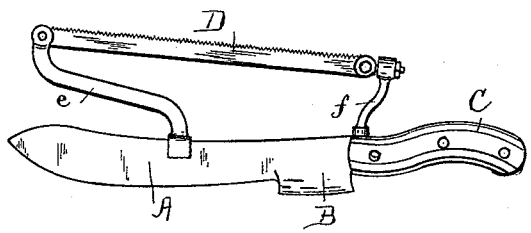
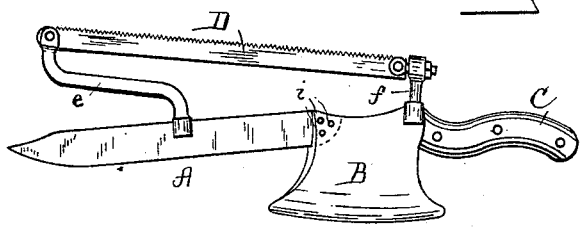
WITNESSES
T. D. McClary
H. J. Wetmore
INVENTOR
Philip Ganzhorn
By H. N. Jenkins, Attorney

UNITED STATES PATENT OFFICE.

PHILIP GANZHORN, OF STREATOR, ILLINOIS, ASSIGNOR OF ONE-HALF TO MICHAEL BYRON MULOCK, OF JOLIET, ILLINOIS.

COMPOUND MEAT-TOOL.

SPECIFICATION forming part of Letters Patent No. 583,682, dated June 1, 1897.

Application filed May 11, 1895. Serial No. 548,929. (No model.)

*To all whom it may concern:*

Be it known that I, PHILIP GANZHORN, a citizen of the United States, residing at Streator, in the county of La Salle and State of Illinois, have invented new and useful Improvements in a Compound Meat-Tool, of which the following is a specification.

The object of this invention is to combine in a single implement a device for cutting and slicing meats as well as for sawing and chopping the bones thereof.

It is my purpose to make the implement in different sizes, and thus adapt same for the use of butchers and meat-venders as well as for kitchen and general household purposes.

My invention is clearly illustrated in the accompanying drawings, whereon—

Figure 1 represents the implement in its lightest form for family use, and Fig. 2 the said implement as adapted for meat-stalls and market purposes.

The letter A designates a knife having an enlarged portion B, with handle C secured thereto and a saw D connected with the back of the implement by means of brackets e f. The enlarged portion of the knife-blade may be made integral therewith, as shown at Fig. 1, or it may be somewhat heavier and of a separate piece of metal, in which case the knife-blade should be secured thereto by means of rivets, as shown at i in Fig. 2, the cutting edge nearest the handle being substantially parallel with the forward edge and handle of the implement.

From the above description it will be seen that the implement can be used for cutting, slicing, or chopping meat and for sawing the bones thereof whenever necessary.

The bracket e serves as a rest for one hand of the operator and aids him in steadying the implement during the cutting and sawing process.

Having described my invention, what I claim as new, and desire to secure by Letters Patent, is—

1. In cutlery, a knife-blade having a handle at one end, and having at one side two cutting edges, the edge nearer the handle projecting outside of the line of the forward edge and handle, and being substantially parallel therewith, as described.

2. The combination of a knife-blade having a handle at one end, and having at one side two cutting edges, the one nearer the handle projecting outside of the line of the farther one, with a saw-blade and brackets connecting same with the back of the knife-blade, the main part of the forward bracket being parallel with the aforesaid blades and midway between same, to serve as a handle, substantially as set forth.

In testimony whereof I affix my signature in the presence of two witnesses.

PHILIP GANZHORN.

Witnesses:
E. MYERS,
U. S. PAINTER.